Patented Oct. 9, 1951

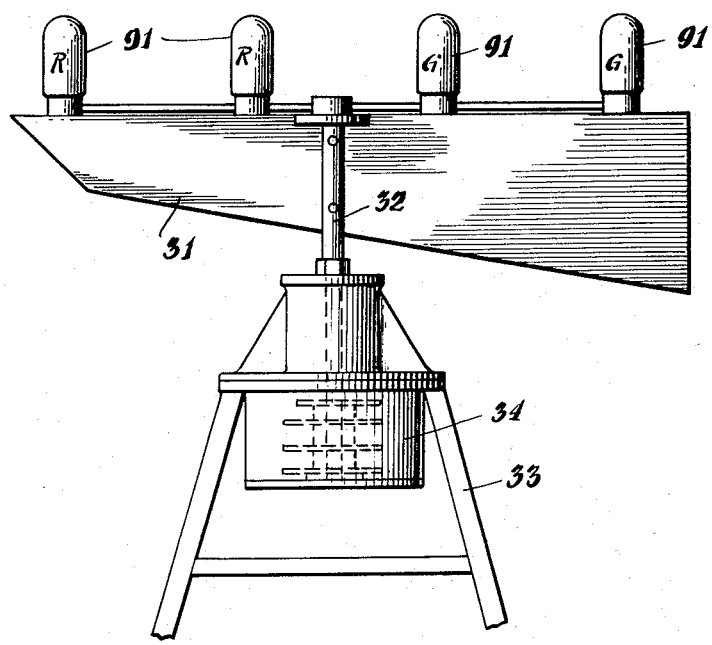
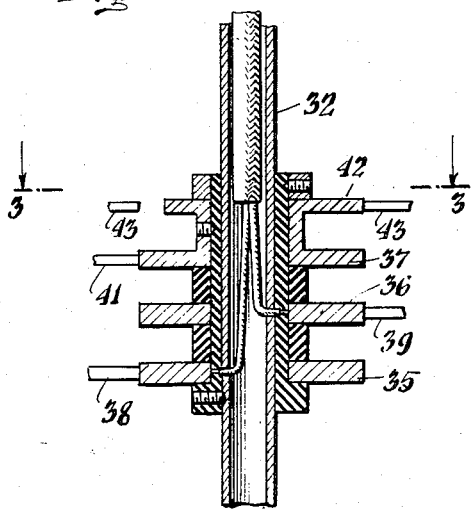
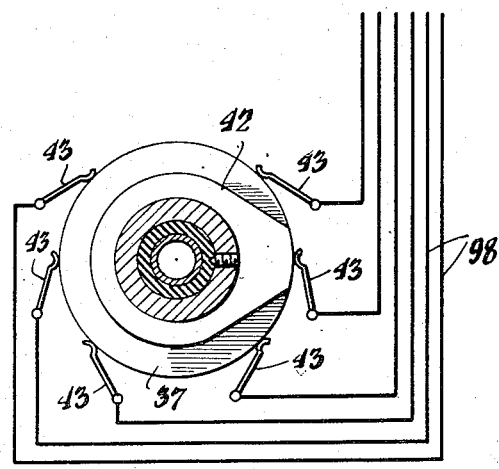

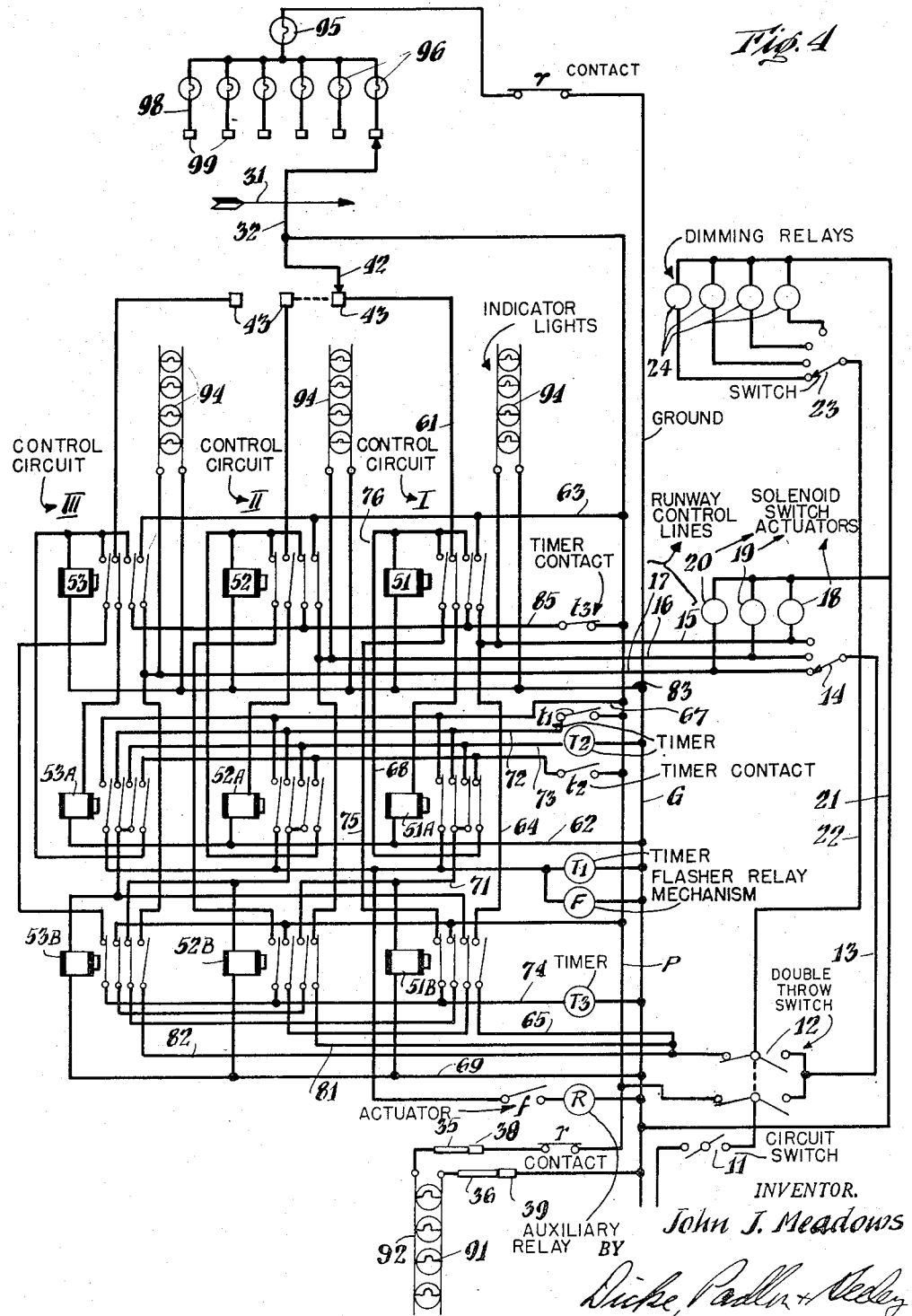

2,570,831

UNITED STATES PATENT OFFICE 2,570,831

ELECTRIC CONTROL SYSTEM

John J. Meadows, New York, N. Y.

Application September 12, 1947, Serial No. 773,668

11 Claims. (Cl. 177—352)

This invention relates to electric control systems and especially to a system for controlling the operation of runway lighting circuits at airports.

It is customary at some so-called service airports, where no attendants are on duty at night, to leave illuminated at the end of the working day whichever runway corresponds to the direction of the wind prevailing at that time. If the wind direction shifts during the night an aviator not only will have no warning of the shift, but will be forced to land across the wind, or, if aware of the new wind direction, to land on an unlighted runway, either of which courses involves considerable risk.

An object of the present invention is to provide an improved runway lighting control system, constructed and arranged to automatically supervise the runway lighting at airports and to shift the lighting from one runway to another as a result of sustained shifts in the direction of the prevailing wind.

A further object is to provide a control system for the purpose stated which will effect switching of the runway lighting circuits only after a change in wind direction has lasted for a determinate period, so that the control system will not respond to temporary variations in wind direction, but only to changes in the prevailing wind.

A further object is to provide a system of the type set forth arranged to signal an approaching aviator when the wind direction does not correspond with the lighted runway, warning him that he will land cross-wind if he comes in under conditions then existing, and advising him to wait for the system to function and illuminate another runway, or for the wind to return to its previous direction.

A still further object is to provide an airport lighting control system having indicator circuits for showing the lighting conditions of the associated airport at any remote point.

A still further object is to provide a control system for accomplishing the above objects without altering the present runway lighting circuits and to provide a system which can be applied to present circuits for the automatic control thereof.

Other objects will appear from the following description of an illustrative embodiment of the invention, taken together with the attached drawings in which Fig. 1 is a view in elevation of a wind vane or other wind responsive device constructed in accordance with one embodiment of this invention.

Fig. 2 is a sectional view of a contact mechanism actuated by the wind vane shown in Fig. 1.

Fig. 3 is a diagrammatic view taken generally on the line 3—3 of Fig. 2 looking in the direction of the arrows; and Fig. 4 is the circuit diagram illustrative of the present invention.

For the purposes of disclosure the present invention is herein described in connection with a runway lighting installation now in use at a well-known service airport. It will be apparent, however, that the details of different installations at different fields will vary within wide limits under differing local conditions, and that the invention is not limited to controlling any single type of runway circuit, but is adapted for use in connection with substantially any of the present series lighting systems for airports.

The installation chosen for illustration comprises three lighting circuits for selectively illuminating any one of three separate runways, each comprising a series lighting circuit of such capacity as to require dimming of the lighted runway before the circuit is opened and the lights extinguished, and then a delay of approximately thirty seconds before the new runway is illuminated. Each runway circuit is controled by a solenoid-actuated oil switch operated by potential applied through a switch operating line connected thereto. A manually operated switch is employed for selectively actuating one of the runway circuit switches to illuminate the selected runway.

In Fig. 4, enough of the standard manual circuit is shown to clearly indicate the manner in which the present invention is applied thereto for automatically controlling the runway lighting. The main circuit is a conventional three wire circuit having a common ground G, and a circuit switch 11. There is also provided a power line P for supplying energy to the circuits, as will be hereinafter more fully described. In the present invention the latter is connected through a double pole, double throw switch 12 and line 13 to a manual switch 14 which is provided in the present system for applying potential selectively through three runway lighting control lines 15, 16, and 17 to one of the solenoids 18, 19 and 20 for actuating an associated runway circuit switch. In other words, applying potential to solenoid 18 results in lighting one runway, while operation of the solenoids 19 or 20 results in lighting either of the other two runways, according to the position of the manual control switch 14. The coils of the switch control solenoids are connected to the common ground through a line 21. The other pole of the double throw switch 12 is connected through a line 22 with a manual switch 23 adapted to connect into the circuit any one of four dimming control relays 24 as illustrated, for controlling the intensity of the illumination and to permit dimming of the lighted runway prior to opening of the circuit. Each of the relays 24 is adapted to produce the desired intensity of illumination by the adjustment of a control motor on an intensity controlling transformer, as is well known in the art.

The operation of the hereinafter described automatic control circuits will be readily understood if it is kept in mind that selection of the runway to be illuminated, and darkening of the other runways, is accomplished by applying potential to one of the selected runway control lines 15, 16, or 17. Applying potential to one of these lines results in illumination of the single runway controlled thereby through the present runway circuits.

Automatic control of the dimming operation and shifting of illumination from one runway to another as a result of a shift in wind direction is accomplished in the present invention. For this purpose the control system shown in Fig. 4 comprises three similar control circuits which are actuated by a wind-responsive mechanism such as a wind vane 31 (conventionally shown as an arrow in Fig. 4), supported on a rotatable shaft 32 mounted in a suitable support 33 which includes a housing 34 in which three contact rings 35, 36 and 37, insulated from each other engage contact brushes 38, 39 and 41, respectively. A cam-shaped sector 42, engaging a brush 43 is a physical part of the contact ring 37, for completing the circuit through one or the other of the control circuits in accordance with the position of the wind vane. The brushes 38 and 39 are connected by contact rings 35 and 36 to signal lights on the wind vane which are hereafter described.

The control circuits are numbered I, II, and III, in Fig. 4. Control circuit I has a main relay 51, a selector relay 51A, and an auxiliary relay 51B. Likewise, the control circuits II, and III respectively, have main relays 52 and 53, selector relays 52A and 53A, and auxiliary relays 52B and 53B. The main relay of each control circuit controls the illumination of one runway and holds the circuit closed until a sustained change in wind direction results in actuating the control circuit of another runway. Each selector relay energizes the timing circuits and each auxiliary relay supervises the proper sequence of operations and, in the illustrated embodiment, controls the dimming of the associated runway lights prior to their extinction. In addition, three timing relays and a flashing mechanism are provided.

The timing relay T1 controls the relay contact t1. Timing relay T2 controls relay contact t2. Timing relay T3 controls timing contact t3.

Each of the control circuit relays, for example, 51, 51A and 51B has four contacts. Each main relay 51, 52, and 53, has three normally open and one normally closed contacts when the relay is deenergized. Each selector relay 51A, 52A, 53A, has four normally open contacts when deenergized, and each auxiliary relay 51B, 52B, 53B, has three normally closed and one normally open contacts when deenergized.

Referring to control circuit I, a description of which will suffice for all control circuits, the associated brush 43 on the wind-responsive actuator is connected through a line 61 with the second contact of the main relay 51 and through it to the selector relay 51A, the other side of which is connected to the ground return line G through a connection 62. The runway control line 15 which is controlled by circuit I is connected to the fourth contact of the main relay 51, which contact is normally open. When relay 51 closes the contact line 15 is connected through line 63 with one side of the power supply. This also supplies potential to the normally open fourth contact of the auxiliary relay 51B. When auxiliary relay 51B closes potential is applied through a line 65 and switch 12 to the intensity control line 22.

The main timer relay T1 is connected to ground on one side and on the other through the normally open first contact of selector relay 51A to the live side of the power line through line 67. A flasher mechanism F is connected in the same circuit along with an auxiliary relay R. The coil of auxiliary relay 51B is connected through line 69 with ground and through line 71, the second contact of selector relay 51A and line 72 with timer contact t1 and thence to the power line. The second timer relay T2 is connected on one side to ground and on the other through line 73 with the third contact of selector relay 51A and through the second contact to the timer contact t1.

The third timer relay T3 is connected on one side to the ground and on the other through a line 74 with the first contact of auxiliary relay 51B, line 75, the first contact of the main relay 51, part of line 76 with the third contact of main relay 51 to timer contact t3 which is normally closed.

The fourth contact of auxiliary relay 52B in control circuit number II is connected through line 81 with the intensity control line 22, and the fourth contact of the auxiliary relay 53B in control circuit number III is connected by line 82 with the intensity control line 22. At the same time it will be noted that runway light control line 16 which is controlled by circuit number II is connected to the fourth contact of main relay 52, and runway control line 17, which is controlled by circuit number III is connected to the fourth contact of main relay 53. The fourth contact of each main relay 51, 52, 53, respectively, is connected through line 63 with the live side of the power line P.

The timer contact t3 is connected through line 85 with the third contact of each main relay.

Operation of the mechanism so far described will be apparent. Assuming that the runway lighting circuit controlled by line 16 and control circuit II is illuminated, the relays will be in the positions shown in circuit II, Fig. 4. Potential is applied to line 16 through line 63 and the fourth contact of relay 52. This energizes the solenoid 19 connected between ground and the line 16 so as to actuate the conventional runway control switch for the associated runway. As illustrated auxiliary relay 52B is energized, thereby energizing the intensity control circuit 22 and the relay 24 corresponding to the setting of the manual selector switch 23. Assuming that a change in wind direction has shifted the position of the wind vane 31, as shown in full line in Fig. 4, so that contact is now made through sector 42 and brush 43 to signal circuit I, it will be apparent that potential is applied through the normally closed second contact of main relay 51 to operate selector relay 51A, closing all four contacts thereof. This energizes the main selector timer T1 and energizes the flasher motor F which operates flasher auxiliary relay R, and initiates the sequence of operations resulting in a shift in illumination from the runway controlled by line 16 to that controlled by line 15. The timer T1 is a delayed action relay which closes only after the expiration of a determinate period. If the change in wind direction does not persist for the required length of time, but returns to its original direction, the vane 31 will return to its original position corresponding to the control circuit II which is already actuated. This will result in the selector relay 51A of control circuit I dropping out, whereupon the timer T1 will reset itself for the next selector operation.

However, assuming that the prevailing wind shifts so as to energize circuit I as described, and that it persists until the end of the time limit required by the timer relay T1, at the expiration thereof the timer relay contact $t1$ closes and energizes the auxiliary relay 51B through the second contact of selector relay 51A. Energizing the auxiliary relay 51B breaks the holding circuit of the auxiliary relay 52B then energized, through the opening of the normally closed contacts of relay 51B and the auxiliary relay 52B will fall out. Deenergizing auxiliary relay 52B closes its first contact which closes the circuit of auxiliary timer T3 and at the same time the intensity control of the runway lights will be deenergized by opening of the fourth contact of the deenergized relay 52B. When the timing relay T1 operates it closes the contact $t1$, energizing the second timing relay T2 through the second and third contacts of selector relay 51A.

If T3 is timed for ten seconds it will permit the dimming of the runway lights before the contact $t3$ opens the holding circuit of the main relay 52 that has been energized. If the timing relay T2 is timed for forty seconds its delay interval will retard the closing of the new circuit until thirty seconds after the other circuit has been deenergized. When timing contact $t2$ closes it will energize the main relay of the new circuit which will become self holding through its third contact and timing contact $t3$ which has reclosed during the time interval. The closing of the main relay will energize the main lighting circuits through the control circuit passing through the fourth contact. This will simultaneously energize the intensity controls through the fourth contact of the auxiliary relay. The circuits are then set up for the illumination of the proper runway and the closing of the main relay deenergizes the selector relay through the opening of its second contact. This deenergizes the timers T1, T2, and the flasher F. The timer T3 was deenergized when the other main relay was deenergized at the end of the ten second setting of T3.

In order to warn an aviator who may be coming in for a landing during the period of delay between the time when the wind vane has shifted and the time when such shift is effective to change the runway lighting, a series of lights 91 is connected in a circuit 92 and the lights are preferably located on the wind vane 31 which is in a prominent position readily visible to an approaching pilot. The circuit 92 is connected through brushes 38 and 39 and contact rings 35 and 36 to the power supply. During this delay period when the wind has shifted, the lights 91 on the vane 31 are caused to continuously flash as a result of operation of the flasher motor F which in turn operates the auxiliary relay R, to open and close the contact $r$ to produce flashing of the lights 91. At completion of the timing cycle the flasher mechanism is deenergized.

It may also be desirable to provide an indicator lighting system for indicating at some remote point, such as a control tower or the like, the condition of the runway lighting circuits and to indicate which runway is illuminated. For this purpose, indicator lights 94 are provided and are connected in parallel between the fourth contact of the associated main relay and the common ground G. In a similar manner the wind direction can be indicated at a remote point. For example, as shown at the upper part of Fig. 4, the lights 96 can be arranged in a circle around a central light 95, any two pair of lights in each set being diametrically opposite each other on opposite sides of the central light 95. Light 95 is connected to one side of the power line G, in this case, through contact relay R. Each light 96 is connected through one of the lines 98 to a brush 99 adapted to engage the sector 42. Contact with sector 42 will illuminate one light 96 and the center light 95 thus indicating the wind direction. Any suitable coloring arrangement for the remote indicating lights can be employed.

It should be noted that the double pole, double throw switch 12 as illustrated is set for automatic operation of the lighting circuits by the control system of the present invention. Under these circumstances the setting of the manual switch 14 is ineffective, while the setting of the manual switch 23 for controlling the intensity of the runway illumination is effective for determining the degree of such illumination. If it is desired to cut out the automatic control system and resort to the usual manual control of the runway lighting circuits, this is accomplished by throwing the double pole, double throw switch 12 into the opposite position from that shown in Fig. 4. In such position the manual control switches 14 and 23 are connected in parallel with each other and in series with the power line. Under these conditions, the position of the switch 14 will determine what runway is illuminated and the position of the switch 23 will determine the intensity of such illumination.

Having described an illustrative embodiment of the invention, it will be understood that various changes and modifications therein may be made without departing from the invention as set forth in the following claims.

I claim:

1. The combination with a plurality of interconnected lighting circuits having a plurality of relays for separately and selectively illuminating a plurality of airport runways and having means for selectively closing one of said circuits at a time, of a wind-actuated control system for changing the selected closed circuit to shift the illumination from a pre-selected runway to another as a result of a definite shift in wind direction, comprising a switch mechanism, a movable wind-responsive means for positively and automatically actuating said switch mechanism and timing means for delaying the operation of said switch mechanism by said wind-responsive means for a determinate period following the movement thereof by a shift in wind direction, whereby the illumination of said runway is changed only after said change in wind direction has remained effective for said determinate period, and means for visually indicating the duration of said determinate period.

2. The combination with a plurality of lighting circuits for separately illuminating a plurality of airport runways and having means for selectively closing one of said circuits at a time, of a wind-actuated control system for changing the selected closed circuit to shift the illumination from a pre-selected runway to another as a result of a shift in wind direction, comprising a switch mechanism, a movable wind-responsive means for actuating said switch mechanism, means for delaying the operation of said switch mechanism by said wind-responsive means for a determinate period following the movement thereof by a shift in wind direction, whereby the illumination of said runway is changed only after said change in wind direction has remained effective for said determinate period, and means for visually indicating the duration of said period including a signal circuit, flasher means for alternately making and breaking said signal circuit, a circuit for operating said flasher means and means for breaking said flasher operating circuit at the expiration of said determinate period.

3. The combination with a plurality of lighting circuits for separately illuminating a plurality of airport runways and having means for selectively closing one of said circuits at a time, of a wind-actuated control system for changing the selected closed circuit to shift the illumination from a pre-selected runway to another, as a result of a shift in wind direction, comprising a switch mechanism, a movable wind-responsive means for actuating said switch mechanism, means for delaying the operation of said switch mechanism by said wind-responsive means for a determinate period, whereby the illumination of said runway is changed only after said change in wind direction has remained effective for said determinate period, means for visually indicating the duration of said period including a signal lighting circuit, flasher means to cause flashing of signal lights thereon, a circuit for operating said flasher means, and means for breaking said flasher operating circuit at the expiration of said determinate period.

4. The combination with a plurality of lighting circuits for separately illuminating a plurality of airport runways and having means for selectively closing one of said circuits at a time, of a wind-actuated control system for changing the selected closed circuit to shift the illumination from a pre-selected runway to another, as a result of a shift in wind direction, comprising a switch mechanism, a movable wind-responsive means for actuating said switch mechanism, means for delaying the operation of said switch mechanism by said wind-responsive means for a determinate period, whereby the illumination of said runway is changed only after said change in wind direction has remained effective for said determinate period, means for visually indicating the duration of said period including a signal lighting circuit on said wind-responsive means, flasher means to cause flashing of signal lights thereon, a circuit for operating said flasher means, and means for breaking said flasher operating circuit at the expiration of said determinate period.

5. The combination with a plurality of lighting circuits for separately illuminating a plurality of airport runways and having means for selectively closing one of said circuits at a time, of a wind-actuated control system for changing the selected closed circuit to shift the illumination from a pre-selected runway to another as a result of a sustained shift in wind direction, comprising a switch mechanism, a movable wind-responsive means for automatically actuating said switch mechanism, means for delaying the operation of said switch mechanism by said wind-responsive means for a determinate period following the movement thereof by a shift in wind direction, whereby the illumination of said runway is changed only after said change in wind direction has remained effective for said determinate period, means for visually indicating the duration of said period including a signal circuit on said wind responsive means, means for alternately making and breaking said signal circuit, and means for cutting out the operation of said making and breaking means at the expiration of said determinate period.

6. The combination with a plurality of lighting circuits for separately illuminating a plurality of airport runways and having means for selectively closing one of said circuits at a given time, of a control system comprising a separate control circuit for each runway lighting circuit, wind responsive means in connection with the control circuit for selectively operating the same, a signal circuit including a flasher mechanism for rapidly making and breaking said signal circuit to indicate an impending change of wind direction, said flasher mechanism being in connection with said lighting circuit, a delayed action relay to prevent premature operation of the control circuits, means for operating said flasher mechanism and initiating operation of said relay, and means for closing the associated lighting circuit.

7. The combination with a plurality of lighting circuits for separately illuminating a plurality of airport runways and having means for selectively closing one of said circuits at a given time, of a control system comprising a separate control circuit for each runway lighting circuit, wind responsive means in connection with the control circuit for selectively operating the same, a signal circuit including a flasher mechanism for rapidly making and breaking said signal circuit to indicate an impending change of wind direction, said flasher mechanism being in connection with said lighting circuit, a delayed action relay to prevent premature operation of the control circuits, means for operating said flasher mechanism and initiating operation of said relay, and means controlled by said relay for closing the associated lighting circuit.

8. The combination with a plurality of lighting circuits for separately illuminating a plurality of airport runways and having means for selectively closing one of said circuits at a given time, of a control system comprising a separate control circuit for each runway lighting circuit, wind responsive means in connection with the control circuit for selectively operating the same, a signal circuit including a flasher mechanism for rapidly making and breaking said signal circuit to indicate an impending change of wind direction, said flasher mechanism being in connection with said lighting circuit, a delayed action relay to prevent premature operation of the control circuits, means for operating said flasher mechanism and initiating operation of said relay, and means controlled by said relay for closing the associated lighting circuit and terminating operation of said flasher mechanism.

9. The combination with a plurality of lighting circuits for separately and selectively illuminating a plurality of airport runways and having means for selectively closing one of said circuits at a given time, of a control system for changing the selected closed circuit to shift the illumination from one pre-selected runway to another as a result of a positive shift in wind direction comprising a separate control circuit for each runway lighting circuit, a signal circuit including a flasher mechanism for rapidly making and breaking said signal circuit, a delayed action relay, means for operating said flasher mechanism and initiating operation of said relay, and means for closing the associated lighting circuit and terminating operation of said flasher mechanism.

10. The combination with a plurality of lighting circuits for selectively illuminating a plurality of airport runways and having means for selectively closing one of said circuits at a given time, of a wind actuated control system for changing the selected closed circuit to shift the illumination from a pre-selected runway to another as a result of a positive shift in wind direction comprising a separate control circuit for each runway lighting circuit, a signal circuit including a flasher mechanism for making and breaking said signal circuit over a given period of time, a delayed action relay, means for operating said flasher mechanism and initiating operation of said relay, means for closing the associated lighting circuit and terminating operation of said flasher mechanism, and intensity control circuit, and means for energizing said intensity control circuit prior to opening and subsequent to closing said runway lighting circuits.

11. In an airport having an electrical control system for selectively illuminating separate runways or air-strips in the airport, said system having a plurality of high voltage lighting circuits of such capacity as may require dimming of an already lighted runway before the operating circuit is energized, the improvement comprising wind actuatable responsive means, switch operable means in connection with said responsive means, a plurality of circuits in connection with said operable means, each of said circuits being provided with a main relay for controlling the illumination of the lights on a runway in said airport, a selector relay for initiating the flashing and timing of the circuit to control response to wind actuated means and an auxiliary relay for controlling the intensity of illuminating the runway light controlled by said circuit, timing means for each of the circuits, flashing means in connection with the circuits to warn of a displacement in wind direction, timing contacts in connection with each of said timing means, so coordinated as to produce a sequence of operations whereby automatic control of the runway lights is provided in a logical sequence for the safe operation of said runways providing a time delay before activation of a change of illumination resulting from a shift in wind, and means in connection with said circuits to warn of the impending change.

JOHN J. MEADOWS.

REFERENCES CITED

The following references are of record in the file of this patent:

UNITED STATES PATENTS

| Number | Name | Date |
| --- | --- | --- |
| 1,776,111 | Donaldson | Sept. 16, 1930 |
| 2,045,994 | Plaisted | June 30, 1936 |
| 2,067,413 | Plaisted | Jan. 12, 1937 |
| 2,325,258 | Mallory | July 27, 1943 |
| 2,350,594 | Dallas | June 6, 1944 |